United States Patent
Hunt

[11] Patent Number: 5,305,986
[45] Date of Patent: Apr. 26, 1994

[54] FLUID CONTROL VALVE

[76] Inventor: Kevin F. Hunt, 2148 Looscan La., Houston, Tex. 77019

[21] Appl. No.: 40,474

[22] Filed: Mar. 31, 1993

[51] Int. Cl.$^5$ .......................... F16K 5/06; F16K 5/10
[52] U.S. Cl. .................................. 251/207; 251/209; 251/174; 251/316
[58] Field of Search ............... 251/207, 209, 174, 315, 251/316, 367

[56] References Cited

U.S. PATENT DOCUMENTS

| | | |
|---|---|---|
| 3,134,405 | 5/1964 | White et al. ............ 251/207 X |
| 4,020,870 | 5/1977 | Carlson . |
| 4,130,128 | 12/1978 | Kaneko . |
| 4,158,369 | 6/1979 | St Örzinger et al. . |
| 4,212,321 | 7/1980 | Hulsey . |
| 4,223,811 | 9/1980 | Czegledi . |
| 4,289,165 | 9/1981 | Fredd . |
| 4,624,281 | 11/1986 | Vidal et al. . |
| 4,655,078 | 4/1987 | Johnson . |
| 4,729,403 | 3/1988 | Roche . |
| 4,741,361 | 5/1988 | McHugh . |
| 4,852,610 | 8/1989 | McHugh . |
| 4,899,981 | 2/1990 | Thomas, Jr. . |
| 4,971,109 | 11/1990 | McHugh . |
| 4,993,453 | 2/1991 | McHugh . |
| 4,995,423 | 2/1991 | McHugh . |
| 5,036,883 | 8/1991 | McHugh . |
| 5,040,566 | 8/1991 | Orlandi . |
| 5,052,655 | 10/1991 | Ackroyd . |
| 5,052,657 | 10/1991 | Winship . |
| 5,070,909 | 12/1991 | Davenport . |
| 5,103,862 | 4/1992 | McHugh . |
| 5,113,909 | 5/1992 | Marin et al. . |

*Primary Examiner*—Arnold Rosenthal
*Attorney, Agent, or Firm*—Tim Headley; Lori Stiffler

[57] ABSTRACT

A fluid control valve, which allows selective change of the flow rate of fluid through the valve in the face of high temperatures and high pressures without undue wear to the integral downstream sealing seat, includes a body, having a passageway which consists of a first section and a second section, and a ball disposed in the second section of the passageway. The ball is rotatable around a central axis and has a first through hole of one diameter and a second through hole having a minimum diameter which is smaller than the first diameter. A sacrificial annular upstream seat is disposed upstream from the ball and has an internal diameter smaller than both the diameter of the first through hole and the diameter of the first section of the passageway through the body. As a result of the difference in size between the diameter of the first section and the internal diameter of the sacrificial annular seat, a pressure differential is created, causing a reduction in turbulence and detrimental forces on the downstream seat, thereby protecting the downstream seat, which is an integral part of an end cap or end housing, and has an internal diameter larger than the internal diameter of the sacrificial annular upstream seat, from premature wear, erosion and other damage when the flow rate is varied.

20 Claims, 4 Drawing Sheets

101

Rotate the ball to a first position in which the first through hole is substantially aligned with the passageway

102

Rotate the ball approximately ninety degrees

FLUID CONTROL VALVE

BACKGROUND AND SUMMARY OF THE INVENTION

This invention relates to fluid control valves, and more particularly, to ball valves used to control the flow rate of fluids, such as high pressure steam. The use of ball valves to control the flow of fluid is well known in the art. The ball component of the valve may have one or more through holes allowing fluid to pass through the ball at one or more rates. Ball valve members are typically confined between two annular sealing seats, one located upstream with respect to the ball and one located downstream. In most applications, the body which houses the ball is composed of two halves which are sealingly joined at approximately the midpoint of the ball.

Under conditions involving high temperatures and high pressures, ball valves have not been successfully used as fluid control valves because of several problems. First, the sealing seats are typically made of tetrafluoroethylene or other sealing materials which usually cannot withstand high temperatures and pressures. Additionally, when a ball valve is in a partially open position to allow for a desired minimum flow rate, because of the high pressure differential across the valve, the sealing surfaces of the sealing seats erode and cause leakage in the closed position. Additionally, in valves where the body is split at approximately the midpoint of the ball, leakage around the stem of the ball and at the interface between the two halves of the body occurs due to the turbulent forces acting at the interface between the two halves of the body.

In some high temperature and high pressure applications, mitered valves have been used, which feature the use of a globe valve or a series of discs upstream of a ball valve to regulate flow. However, mitered valves are likewise subject to erosion and leakage in high temperature and high pressure applications.

This invention overcomes the above-noted and other deficiencies of the related art, by providing a method and apparatus for allowing the selective control of the rate of fluid flow through a valve between a minimum and maximum rate, while at the same time protecting a downstream sealing seat, which is an integral part of an end cap or end housing, from damage. The ball valve of this invention is able to withstand high temperature and high pressure conditions, which other fluid control valves known in the art cannot withstand.

The invention features a valve which is capable of allowing selection between a maximum or minimum flow rate and flow rates in between. Through the use of a sacrificial annular upstream sealing seat, erosion of the integral downstream sealing seat is minimized. The invention features the use of ball, body, end cap or end housing, and sealing components made of materials able to withstand high temperatures and pressures. In another feature of the invention, the use of a body and end cap in a conformation superior to the existing art minimizes erosion and leakage around the ball. The invention eliminates the undesirable feature common to existing valves wherein they are unable to withstand high temperature and pressure conditions without leakage. The invention further eliminates the undesirable feature of accelerated damage to the downstream integral sealing seat when a ball valve is partially opened to achieve a desired minimum flow rate, or when the position of the ball valve is adjusted to change the flow rate.

The invention also features the use of two through holes of different diameters, allowing selection between a maximum flow rate, a minimum flow rate, or incremental flow rates lying between the two extremes. By providing a second through hole to allow for a minimum flow rate, the high turbulence which results when a single hole valve is placed in a partially open position to achieve a desired, minimum flow rate is avoided. The invention is thereby capable of performing precise fluid flow control, under high temperature and pressure conditions. This invention is the first ball valve which achieves the dual results of allowing a controlled variation or selection of the rate of fluid flow under high temperature and pressure conditions, while simultaneously protecting the downstream seat from damage.

The above features of the invention are accomplished by providing a ball valve disposed in a body having an end cap or end housing. Two through holes are provided through the ball of the ball valve. The first through hole is of one diameter, allowing for a maximum flow rate. The second through hole is disposed at an angle to the first through hole, and is of a smaller diameter allowing for a minimum desired flow rate. The ball of the valve is rotatable through the use of an operator around a central axis which is perpendicular to the passageway through the body in which the ball is disposed. A sacrificial annular upstream seat, having an internal diameter smaller than the diameter of the first passageway, is disposed upstream from the ball. An annular downstream sealing seat is integral to and forms part of the end cap or end housing. The downstream seat has an internal diameter which exceeds the internal diameter of the upstream seat.

Because of the pressure differential created when fluid flows past the sacrificial upstream seat, there is a reduction in the destructive forces acting on the ball and on the integral downstream seat. This sparing effect is most beneficial when the valve is in a partially open position, as it is when changing from the maximum flow rate to the minimum flow rate, or vice versa. The sparing effect of the sacrificial seat on the downstream seat is also seen when the valve is set at the maximum flow rate. When the valve is set at the minimum flow rate position, the ball itself protects the downstream seat from damage. Thus, at maximum or minimum flow rates, or rates in between, the downstream seat has greater protection than in the prior art from turbulent flow. Because the position of the through holes can be varied by rotating the ball through the use of an operator, precise flow rate can be selected at either the maximum or minimum flow rate, or at flow rates between the two extremes, under high temperature and pressure conditions, while simultaneously protecting the integral downstream seat from wear.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiments of the invention. In the drawings, the same members have the same reference numerals.

DESCRIPTION OF THE EMBODIMENTS

Figure 1:
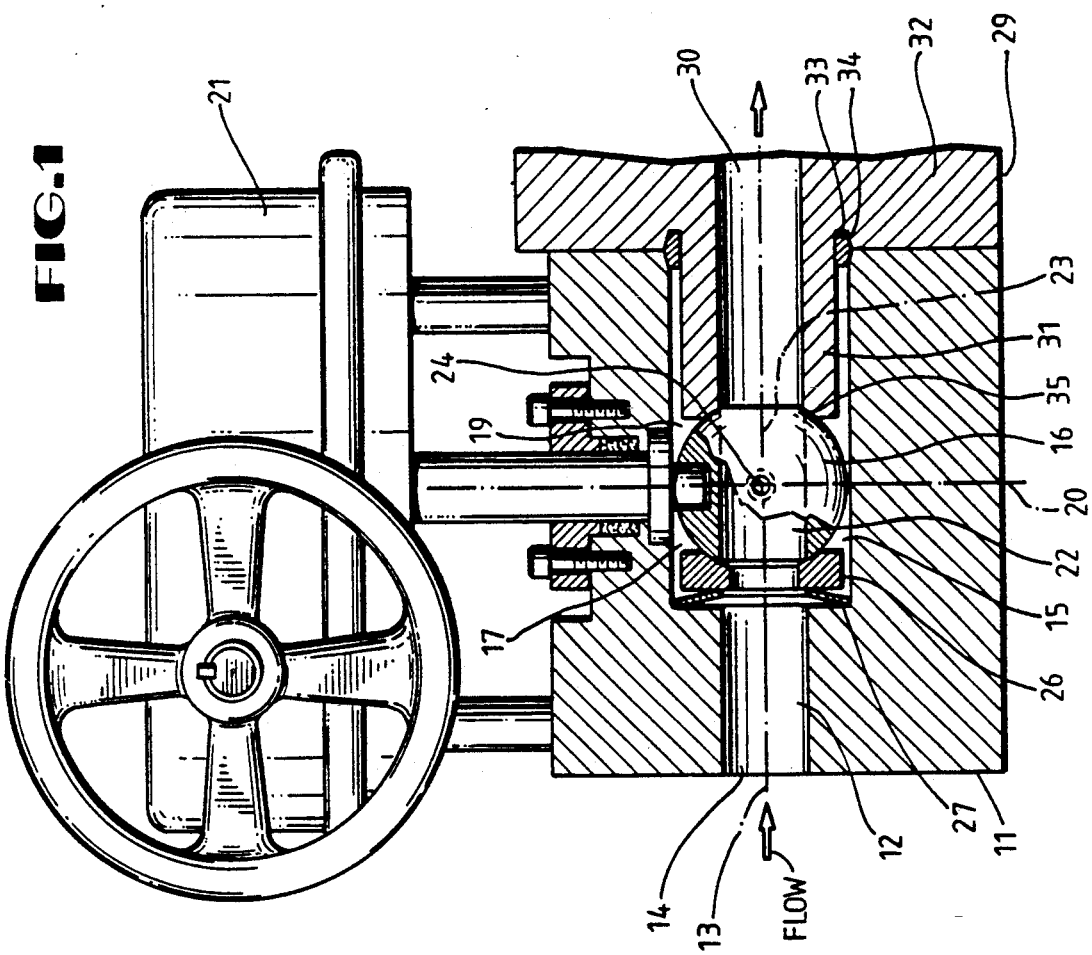
FIG. 1 is a cross sectional side view of a ball valve in accordance with the preferred embodiment of the present invention.

FIG. 1 illustrates the preferred embodiment of the present invention. The fluid control valve comprises a body 11, which has a generally cylindrical passageway 12 extending longitudinally along a first axis 13 through the body. The body may be composed of any material capable of withstanding corrosion, high temperature, and high pressure, but is preferably composed of ASTM (Aug. 15, 1992) A182 F22 alloy steel. The body may have an overlay of carbide or ceramet, but in the preferred embodiment is covered by an overlay of tungsten carbide. As depicted in FIG. 1, the passageway is divided into a first cylindrical section 14, and a second cylindrical section 15. The first cylindrical section may have parallel sides or be cone-shaped, so long as the diameter of the first section where it adjoins the second section is smaller than the diameter of the second section. In the preferred embodiment, the first cylindrical section has parallel sides. The diameter of the second section 15, is large enough to accommodate the components of the ball valve.

A ball 16 is disposed in the second section of the passageway, dividing the second section into upstream 17 and downstream 19 parts. The ball may be composed of any corrosion and abrasion resistant material, which is capable of withstanding high temperatures and pressures, such as stainless steel, ceramet or carbide alloy, but in the preferred embodiment is composed of ASTM (Aug. 15, 1992) A182 F410 stainless steel. The ball may have an overlay of chrome, tungsten, carbide or carbide alloy, but in the preferred embodiment has an overlay of tungsten carbide. In the preferred embodiment, the ball 16 has a diameter larger than the diameter of the first cylindrical section 15. The ball is rotatable around a central axis 20, defining a second axis, which is perpendicular to the longitudinal axis 13 running through the passageway. The ball may be rotated about the axis 20 by any means, but in the preferred embodiment, a multi-turn operator 21, as depicted in FIG. 1, is used.

The multi-turn operator, or actuator, 21, can be man or motor driven, and the motor can be powered electrically, hydraulically, or pneumatically, but in the preferred embodiment an electrical operator is used.

Figure 2:
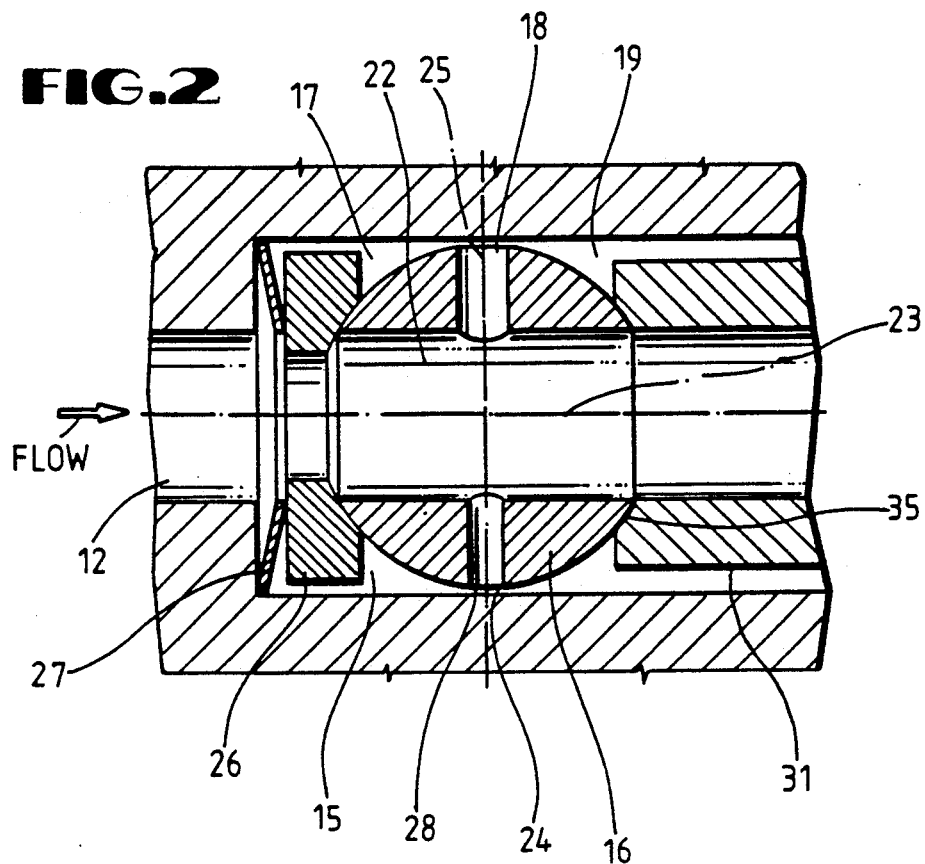
FIG. 2 is a cross sectional top view of the ball valve of FIG. 1.

As depicted in FIG. 1, a first cylindrical through hole 22 extends through the ball in such a fashion that when the ball is rotated around its central axis 20 to a position where the first through hole is aligned with the passageway, a maximum rate of fluid flow through the passageway is achieved. The first through hole has a central longitudinal axis 23, defining a third axis, which is substantially perpendicular to the second axis 20 running through the center of the ball. The first through hole is centered through the ball and is also centered with respect to the passageway when in the fully open position. As depicted in FIG. 2, a second cylindrical through hole 24 extends through the ball at an angle to the first through hole along an axis, defining a fourth axis 25. The diameter of the second through hole is smaller than the first through hole. The second through hole is oriented at an angle to the first through hole 22 and at an angle to the second axis 20. The angle between the first and second through holes may be of any size, however in the preferred embodiment, the first and second through holes are centered so that they both lie in an equatorial plane with respect to the central axis 20 of the ball, and are further disposed at a ninety degree angle to each other.

The diameter of the second through hole is sufficient to allow a desired, minimum amount of fluid flow through the ball and may be constant throughout its length. However, in the preferred embodiment, the second through hole 24 pierces the first through hole 22, and has a cylindrical inlet segment 18 and a cylindrical outlet segment 28. The diameter of outlet segment 28 of second through hole 24 is at least thirty percent smaller than the diameter of inlet segment 18 of second through hole 24. In the preferred embodiment, the diameter of outlet segment 28 determines the minimum rate of flow. In other embodiments where the inlet and outlet segments are equal in diameter, both determine the minimum rate of flow.

Referring back to FIG. 1, a sacrificial annular upstream seat 26 is disposed in the second section of the passageway 15, interposed between the first section of the passageway and the ball. The internal diameter of the sacrificial seat is smaller than the internal diameter of the first section of the passageway, and is smaller than the diameter of the first through hole, such that the ratio of the internal diameter of the sacrificial seat to the internal diameter of the first through hole is in the range of 0.60-0.96. The sacrificial seat may be composed of any sealing material capable of withstanding corrosion, abrasion, heat and pressure, such as steel, ceramet, carbide alloys, steel overlaid with carbide alloys, and wear-resistant metal alloys, but in the preferred embodiment is composed of ASTM A182 F410 stainless steel with a tungsten carbide overlay. An annular spring 27, such as a bellville spring, is positioned between the sacrificial annular seat and the first section, causing the sacrificial annular seat to be pressed up against the ball. The annular spring may be composed of any high stress steel, but in the preferred embodiment is composed of ASTM (Feb. 15, 1993) B637 steel.

An end cap 29 is disposed in the second section of the passageway immediately downstream from the ball. The end cap may be affixed to the body by any conventional means, such as bolting the body and end cap to each other. The end cap has a generally cylindrical bore 30 through it. The end cap is configured so that it has a first upstream portion 31 which has an external diameter small enough to allow it to be matably inserted into the second section of the passageway through the body. The end cap has a second downstream portion 32 which has an external diameter larger than the second section of the passageway through the body. A gasket 33 is disposed in a groove 34 located at the junction between the first and second portions of the end cap. The end cap has an integral annular downstream sealing seat 35, disposed at the upstream end of the first upstream portion, positioned in sealing contact with the ball 16. The end cap and downstream seat may be composed of any material capable of withstanding high temperatures and pressures, such as stainless steel, carbon steel or alloy steel, and may have an overlay of chrome, tungsten, chrome carbide or carbide alloy. In the preferred embodiment the end cap and downstream seat are composed of ASTM A182 F22 alloy steel, and have an overlay of tungsten carbide. The internal diameter of the downstream seat is equal to the diameter of the bore 30 and is larger than the internal diameter of the sacrificial annular upstream seat 26.

As a result of the difference in size between the internal diameter of the sacrificial seat and the diameter of the first section of the passageway, a pressure differential is created across the valve causing a reduction in turbulence as fluid flows from the first section of the passageway 14, past the sacrificial upstream seat 26. As a consequence, there is a reduction in the destructive forces acting on the ball 16 and, more importantly, on the integral downstream seat 35. This sparing effect is seen when the valve is set for maximum flow or is in a partially open position.

As depicted in FIG. 1, the ball is rotated about its central axis 20. This is done in measured increments, using any conventional means. In the preferred embodiment, a multi-turn operator 21 is used, which allows the ball to be rotated to any desired position which respect to the passageway.

The multi-turn operator 21 allows rotation of the ball from a position in which the first through hole 22 is aligned with the passageway to a position where the second through hole 24 is aligned with the passageway. Alternatively, the ball may be positioned at increments between these two extremes. The operator allows selection between a maximum flow rate through the first through hole, a minimum flow rate through the second through hole, and a range of flow rates between the maximum and minimum flow rate values. Due to the presence of the sacrificial upstream seat, the ball can be moved between the maximum and minimum flow positions, under high temperatures and pressures without undue wear or damage to the integral downstream seat. The sacrificial seat 26 is easily replaced, sparing the more costly integral seat and end cap.

The sacrificial upstream seat 26 protects the downstream seat 35 when the valve is set for maximum flow or is in a partially open position. When the valve is set at the minimum flow rate, ball 16 protects the downstream seat from damage. As a result of the combination of the sacrificial seat 26 with the small diameter of the second through hole 24, the integral downstream seat has greater protection from damage due to turbulence in all possible valve positions.

The maximum rate of flow through the valve is determined by the internal diameter of the sacrificial upstream seat 26. The ratio of the internal diameter of the sacrificial seat 26 to the diameter of the first through hole 22 is in the range of 0.60 to 0.96. The internal diameter of the sacrificial seat is selected using standard flow curves so that a desired maximum rate of fluid flow is obtained. The approximate expected maximum rate of fluid flow for a given internal diameter may be calculated as follows:

Gas Flow:
For $\Delta P < 0.5\ P_1$, $$q_m + 479.4\ d^2 \sqrt{\frac{\Delta P(P_1 + P_2)}{KT_1 S_g}}$$ Equation 1

For $\Delta P \geq 0.5\ P_1$, $$q_m = \frac{415.2\ d^2 P_1}{\sqrt{T_1 S_g K}}$$ Equation 2

Where
$q_m$ = Gas flow, SCFM
$d$ = Internal diameter of sacrificial seat 26
$\Delta P$ = Pressure drop, psi
$P_1$ = Upstream pressure
$P_2$ = Downstream pressure
$K$ = Flow resistance constant
$T_1$ = Absolute temperature, °R, inlet
$S_g$ = Specific gravity of gas The minimum rate of fluid flow is determined by the minimum diameter of the second through hole 24. In the preferred embodiment, the minimum diameter of the second through hole is the diameter of outlet segment 28, which is at least 30% smaller than inlet segment 18. The minimum diameter of the second through hole is selected using standard flow curves so that a desired minimum rate of fluid flow is achieved. The approximate expected minimum rate of fluid flow through the second through hole for a given diameter may be calculated using equations 1 and 2, except that:
  $d$ = Minimum diameter of the second through hole 24, which is the diameter of the outlet segment 28 in the preferred embodiment Once the diameters of the sacrificial seat and through holes have been selected, the rate of fluid can be further controlled by varying the position of the first and second through holes with respect to the passageway. Depending on the size of the two through holes, the position of the ball may, in some cases, be adjusted so that no fluid passes through the ball and the passageway is closed.

Figure 3:
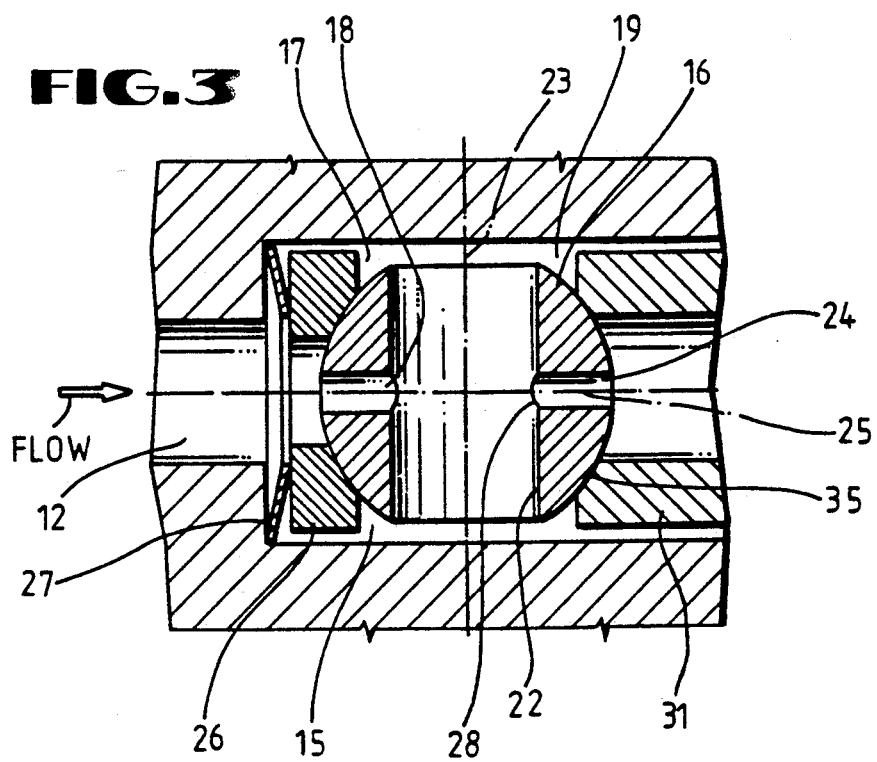
FIG. 3 is a cross sectional top view of the ball valve as shown in FIG. 1 where the second through hole is in alignment with the fluid flow passage.

In operation, the ball 16 of the valve may be aligned in a first position so that the first through hole is in alignment with the fluid passage, as shown in FIG. 2. When so aligned, a maximum amount of fluid is allowed to flow through the ball valve. When the ball 16 is rotated ninety degrees from the position shown in FIG. 2, to a second position as shown in FIG. 3, the second through hole 24 is brought into alignment with the fluid flow passage, and a minimum amount of fluid, determined by the diameter of the second through hole, is allowed to flow through the ball. When the ball is rotated from the first position and the first through hole is only partially aligned with the fluid flow passage, an incremental amount of fluid will flow through the ball.

Although the dimensions of the inlet and outlet passages of the fluid control valve depicted in FIGS. 1-3 will vary according to the application, applicant is currently manufacturing valves in accordance with the present invention for steam boiler applications, the valves ranging in size from ⅛" to 8".

Figure 4:
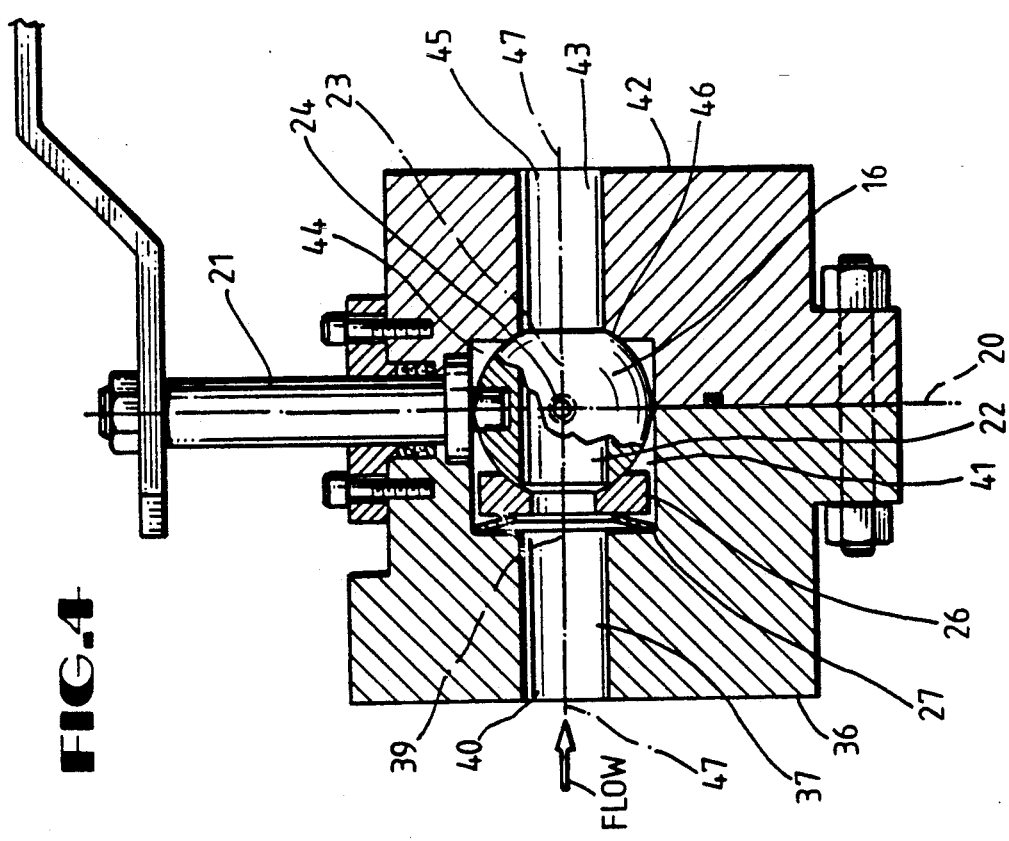
FIG. 4 is a cross sectional side view of a ball valve in accordance with a second embodiment of the present invention.

Referring now to FIG. 4, showing another embodiment of the present invention, the fluid control valve depicted in FIG. 4 comprises a body 36 which has a generally cylindrical passageway 37 extending longitudinally along a first axis 39 through the body. The passageway is divided into a first cylindrical section 40 and a second cylindrical section 41. The first cylindrical section may have parallel sides or be cone shaped, so long as the diameter of the first section where it adjoins the second section is smaller than the diameter of the second section. In the preferred embodiment depicted in FIG. 4, the sides are parallel. The diameter of the second section is large enough to accommodate the components of the ball valve. The length of the second section 41 is shorter than the length of the second section 15 depicted in the preferred embodiment shown in FIG. 1. The length of the second section 41 of the embodiment depicted in FIG. 4 is such that it extends to only approximately the midpoint of the ball 16.

As depicted in FIG. 4, an end housing 42 is sealingly affixed to the second section of the body. The end housing has a generally cylindrical passage 43 extending longitudinally through the end housing. The passage 43 has a first portion 44 and a second portion 45. The first portion 44 has a diameter equal to the diameter of the second section 41 of the passageway through the body. The first portion 44 of the passage through the end housing is contiguous with and sealingly affixed to the second section of the passageway through the body 41. This connection may be accomplished by any conventional means, such as bolting the body and end housing together, and using a gasket for sealing. The second portion 45 of the passage through the end housing has a diameter smaller than the diameter of the first portion 44. The end housing has an integral annular downstream sealing seat 46 disposed between the first portion and the second portion. The internal diameter of the integral downstream seat 46 is equal to the diameter of the second portion 45 of the passage 43. The passage through the end housing is disposed along a longitudinal axis 47 which is continuous with and identical to the longitudinal axis 39 extending through the passageway through the body.

A ball 16 is disposed in the second section of the passageway 41 and the first portion 44 of the passage with the midpoint of the ball being located at approximately the point where they unite, so that the passageway 37 is disposed upstream from the ball and the passage 43 is disposed downstream from the ball. The ball has a diameter larger than the diameter of the first section and is rotatable around a central axis 20, defining a second axis, which is perpendicular to the longitudinal axis 39 running through the passageway. The ball may be rotated around its central axis by any means, but in the preferred embodiment a multi-turn operator 21 is used.

Figure 5:
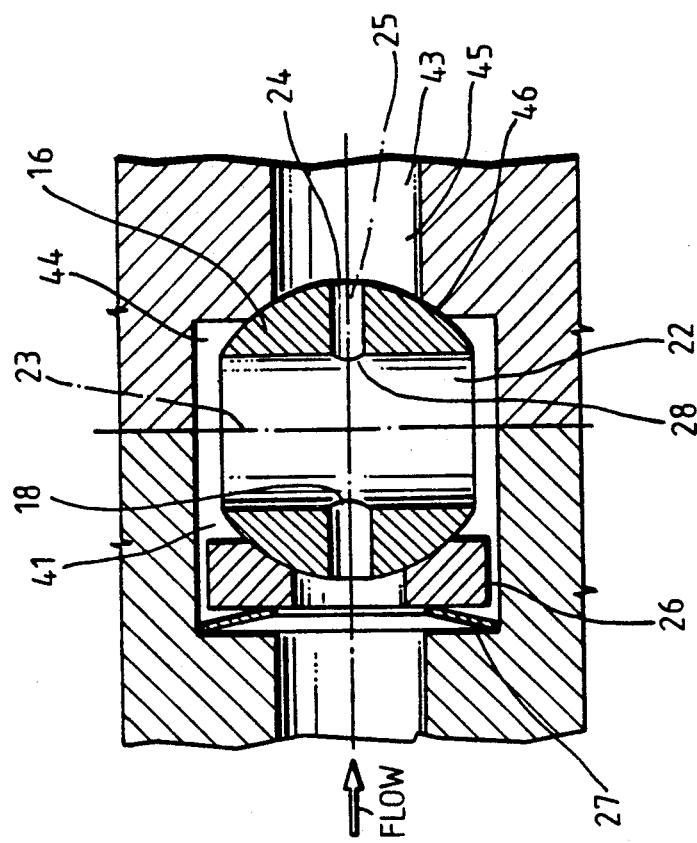
FIG. 5 is a cross sectional top view of the ball valve of FIG. 4.

As depicted in FIG. 4, a first cylindrical through hole 22, extends through the ball in such a fashion that when the ball is rotated around its central axis to a position where the first through hole is aligned with the passageway, a maximum rate of fluid flow through the passageway is achieved. The first through hole has a central longitudinal axis 23, defining a third axis, which is substantially perpendicular to the second axis running through the center of the ball. In the preferred embodiment depicted in FIG. 4, the first through hole is centered through the ball and is also centered with respect to the passageway when in the fully open position. As depicted in FIG. 5, a second cylindrical through hole 24 extends to the ball at an angle to the first through hole along an axis defining a fourth axis, 25. The diameter of the second through hole should be smaller than the first through hole. The second through hole is oriented at an angle to the first through hole and at an angle to the second axis 20. The angle between the first and second through holes may be of any size, however in the preferred embodiment depicted in FIG. 4, the first and second through holes are centered so that they both lie in an equatorial plane with respect to the central axis of the ball, and are further disposed in the equatorial plane at ninety degree angles to each other.

The diameter of the second through hole is sufficient to allow a desired, minimum amount of fluid flow through the ball and may be constant throughout its length. However, in the preferred embodiment depicted in FIG. 4, the second through hole 24 pierces the first through hole 22, and has a cylindrical inlet segment 18 and a cylindrical outlet segment 28. The diameter of outlet segment 28 of second through hole 24 is at least thirty percent smaller than the diameter of inlet segment 18 of second through hole 24. In the preferred embodiment depicted in FIG. 4, the diameter of outlet segment 28 determines the minimum rate of flow. In other embodiments where the inlet and outlet segments are equal in diameter, both determine the minimum rate of flow.

A sacrificial annular upstream seat 26 is disposed in the second section of the passageway 41, interposed between the first section of the passageway 40 and the ball 16. The internal diameter of the sacrificial seat is smaller than the diameter of the first section of the passageway 40. The internal diameter of the sacrificial seat is smaller than the diameter of the first through hole 22, such that the ratio of the internal diameter of the sacrificial seat to the internal diameter of the first through hole is in the range of 0.60–0.96. The internal diameter of the sacrificial seat is smaller than the internal diameter of the downstream integral seat 46 and the second portion of the passage 45. An annular spring 27, such as a bellville spring, is positioned between the sacrificial annular seat and the first section, to cause the sacrificial annular seat to be pressed up against the ball.

The internal diameter of the sacrificial seat 26 is smaller than the diameter of the first section of the passageway 40. As a result of the smaller size of the internal diameter of the sacrificial seat, a pressure differential is created across the valve causing a reduction in turbulence as fluid flows from the first section of the passageway 40 past the sacrificial upstream seat. As a consequence, there is a reduction in the destructive forces acting on the ball 16 and on the integral downstream seat 46 when the valve is positioned for maximum flow or is in a partially open position.

Figure 6:
FIG. 6 illustrates the preferred method of the present invention.

The present invention also relates to a method of controlling the flow rate of fluid through a valve while simultaneously protecting the downstream seat of the valve from turbulence, premature erosion, and failure. The method of the present invention uses a valve having a ball rotatably fixed in a passageway through a body, in which the ball has a first through hole allowing for a first maximum flow rate through the ball, and a second through hole oriented at a ninety degree angle to the first through hole, having a diameter smaller than the first through hole, allowing a second minimum flow rate through the ball. The ball is positioned adjacent to and in contact with an integral annular downstream seat which is part of an end cap. A sacrificial annular upstream seat is disposed immediately upstream from the ball in the passageway and has an internal diameter smaller than both the diameter of the first section of the passageway through the body and the diameter of the first through hole, as more completely described previously. The internal diameter of the sacrificial seat is smaller than the internal diameter of the integral downstream seat. Referring now to FIG. 6, the preferred method of the present invention is illustrated. In step 101, the ball is rotated to a first position to allow flow through the first through hole, which is the maximum flow possible. This is accomplished by aligning the first through hole with respect to the passageway. In step 102, the ball is rotated to a second position, ninety degrees from the first position, to allow flow through the second through hole, which is the minimum flow possible. This is accomplished by rotating the ball ninety degrees so that the second through hole is aligned with the passageway.

The fluid control valve in accordance with this invention can be used to control the flow any type of fluid. Unlike the prior art, however, the ball valve of this invention is suitable for controlling the flow of high pressure and high temperature fluids such as steam. The fluid control valve of this invention is particularly suited for handling pressures up to 600 psi and is capable is withstanding pressures as high as 50,000 psi. The valve of the present invention is likewise wellsuited for handling temperatures up to 300° F. and is capable of handling temperatures as high as 2100° F.

The principles, preferred embodiment, other embodiments, methods and modes of operation of the present invention have been described in the foregoing specification. The invention is not to be construed as limited to the particular forms discussed, because the embodiments are regarded as illustrative rather than restrictive. Moreover, variations and changes may be made by those skilled in the art without departing from the spirit of the invention.

What is claimed is:

1. A fluid control valve comprising:
   a. a body defining a cylindrical passageway for the fluid, the passageway extending through the body, the passageway having a first section and a second section adjacent to the first section, the first section having a first diameter at the point immediately adjacent to the second section, the second section having a second diameter larger than the first diameter, the passageway having a longitudinal axis, the longitudinal axis defining a first axis;
   b. a ball rotatably disposed in the second section, wherein the ball divides the second section into an upstream part and a downstream part, the ball having:
      (i) a second axis extending through the center of the ball, the second axis substantially perpendicular to the first axis;
      (ii) a first cylindrical through hole having a central longitudinal axis defining a third axis, substantially perpendicular to the second axis, the first hole having a third diameter; and
      (iii) a second through hole at an angle to the first through hole, the second through hole having a central longitudinal axis defining a fourth axis, the second hole having a cylindrical inlet segment having a fourth diameter, the fourth diameter less than the third diameter, the second hole having a cylindrical outlet segment having a fifth diameter, the fifth diameter less than the third diameter.
   c. an annular upstream seat disposed in the upstream part, positioned between and in contact with the first section and the ball, the seat having an internal diameter smaller than the first diameter; and
   d. an end cap disposed within the downstream part, the end cap having an integral annular downstream seat positioned in contact with the ball, the downstream seat having an internal diameter larger than the internal diameter of the upstream seat.

2. The fluid control valve of claim 1, wherein the fourth diameter and the fifth diameter are equal.

3. The fluid control valve of claim 1, wherein the fifth diameter is smaller than the fourth diameter.

4. The fluid control valve of claim 1, further comprising an annular spring disposed in the upstream part, the spring being positioned between the annular upstream seat and the first section so as to press the annular upstream seat against the ball.

5. The fluid control valve of claim 1, adapted for use in a high temperature environment between 300° F. and 2100° F. and in a high pressure environment between 600 psi and 50,000 psi.

6. The fluid control valve of claim 5, wherein the high temperature environment is between 300° F. and 1070° F. and the high pressure environment is between 600 psi and 4,000 psi.

7. The fluid control valve of claim 3, wherein the fifth diameter is at least thirty percent smaller than the fourth diameter.

8. The fluid control valve of claim 3, further comprising means for rotating the ball around the second axis in measured increments.

9. The fluid control valve of claim 8, wherein the means for rotating comprises an operator.

10. The fluid control valve of claim 8, wherein the third axis is disposed in an equatorial plane with respect to the second axis.

11. The fluid control valve of claim 8, wherein the fourth axis is substantially perpendicular to the third axis.

12. The fluid control valve of claim 8, wherein the third axis and the fourth axis are both disposed in an equatorial plane with respect to the second axis.

13. The fluid control valve of claim 12 wherein the ratio of the internal diameter of the annular upstream seat to the third diameter is in the range of 0.60-0.96.

14. The fluid control valve of claim 12, wherein the body is composed of alloy steel with an overlay of tungsten carbide, the ball is composed of stainless steel with an overlay of tungsten carbide, the upstream seat is composed of stainless steel with an overlay of tungsten carbide, and the downstream seat and end cap are composed of alloy steel with an overlay of tungsten carbide.

15. The fluid control valve of claim 12, further comprising means for obstructing all fluid flow through the valve.

16. The fluid control valve of claim 11, wherein the third axis is disposed in an equatorial plane with respect to the second axis.

17. An arrangement for controlling the flow of fluid through a fluid control valve having a ball rotatably fixed in a passageway through a body, and having an end cap disposed in the passageway, the ball having a through hole allowing for a first flow rate therethrough, the ball being positioned adjacent to and in contact with an integral annular downstream seat, the downstream seat forming part of the end cap, the arrangement comprising:
   a. means within the ball for allowing a second flow rate smaller than the first flow rate through the passageway;
   b. means for changing the position of the through hole with respect to the passageway to change the flow rate through the passageway; and
   c. means upstream of the ball for reducing pressure differential at the integral seat.

18. The arrangement of claim 17, wherein the means for changing the position comprises a means for selectively rotating the ball so that the position of the through hole can be varied incrementally with respect to the passageway.

19. In a ball valve having a sacrificial annular upstream seat in a passageway and an integral annular downstream seat in the passageway, the ball valve further having a ball with a first through hole for maximum fluid flow and a second through hole oriented at an angle of about ninety degrees to the first through hole, the sacrificial annular upstream seat having an internal diameter smaller than the first through hole, a method for controlling fluid flow comprising the steps of:
   a. rotating the ball to a first position in which the first through hole is substantially aligned with the passageway, to allow maximum flow through the first through hole; and
   b. rotating the ball to a second position approximately ninety degrees from the first position to allow minimum flow through the second through hole.

20. A fluid control valve comprising:
   a. a body defining a cylindrical passageway for the fluid, the passageway extending through the body, the passageway having a first section and a second section adjacent to the first section, the first section having a first diameter at the point immediately adjacent to the second section, the second section having a second diameter larger than the first diameter, the passageway having a longitudinal axis, the longitudinal axis defining a first axis;
   b. an end housing sealingly affixed to the second section, the end housing having a passage extending through the end housing, the passage through the end housing having a first portion, the first portion having a diameter equal to the second diameter, the first portion being contiguous with, and sealingly affixed to the second section, the passage further having a second portion adjacent to the first portion, the second portion having a third diameter smaller than the second diameter, the end housing further having an integral downstream sealing seat disposed between the first portion and the second portion, the downstream seat having an internal diameter equal to the third diameter, and the passage through the end housing having a longitudinal axis substantially identical to the first axis;
   c. a ball rotatably disposed in the second section and the first portion at approximately the point where the second section and the first portion join, the ball having:
      (i) a second axis extending through the center of the ball, the second axis substantially perpendicular the first axis;
      (ii) a first cylindrical through hole having a central longitudinal axis defining a third axis, substantially perpendicular to the second axis, the first hole having a fourth diameter; and
      (iii) a second through hole at an angle to the first through hole, the second through hole having a central longitudinal axis defining a fourth axis, the second hole having a cylindrical inlet segment having a fifth diameter, the fifth diameter being less than the fourth diameter, the second hole having a cylindrical outlet segment having a sixth diameter, the sixth diameter less than the fourth diameter; and
   d. an annular upstream seat disposed in the second section, positioned between and in contact with the first section and the ball, the seat having an internal diameter smaller than the first diameter and larger than the third diameter.

* * * * *

UNITED STATES PATENT AND TRADEMARK OFFICE
CERTIFICATE OF CORRECTION

PATENT NO. : 5,305,986
DATED : April 26, 1994
INVENTOR : Kevin F. Hunt

It is certified that error appears in the above-identified patent and that said Letters Patent is hereby corrected as shown below:

Column 5, line 35, "rate values" should read --rate valves.--

Column 9, line 10, "flow any" should read --flow of any--.

Column 9, line 16, "is withstanding" should read --of withstanding--.

Column 9, line 64, "downstream part." should read --downstream part,--.

Column 11, line 32, "first axis:" should read --first axis;--.

Column 12, lines 17-18, "perpendicular the" should read --perpendicular to the--.

Signed and Sealed this

Thirteenth Day of September, 1994

Attest:

BRUCE LEHMAN

*Attesting Officer*   Commissioner of Patents and Trademarks